United States Patent [19]

Chigusa

[11] Patent Number: 4,553,995
[45] Date of Patent: Nov. 19, 1985

[54] PROCESS FOR PRODUCING IMAGE FIBER

[75] Inventor: Yoshiki Chigusa, Yokohama, Japan

[73] Assignee: Sumitomo Electric Industries, Ltd., Osaka, Japan

[21] Appl. No.: 655,643

[22] Filed: Sep. 28, 1984

[30] Foreign Application Priority Data

Oct. 3, 1983 [JP] Japan ................... 58-183122

[51] Int. Cl.$^4$ .............................................. C03B 23/20
[52] U.S. Cl. ....................................... 65/4.2; 65/4.21; 350/96.25
[58] Field of Search ................ 65/3.11, 4.21, 4.2, 65/4.3; 350/96.25

[56] References Cited

U.S. PATENT DOCUMENTS

| | | | |
|---|---|---|---|
| 2,608,722 | 9/1952 | Stuetzer | 65/4.21 X |
| 3,355,273 | 11/1967 | Siegmund et al. | 65/4.21 |
| 3,690,853 | 9/1972 | Law | 65/4.2 |
| 3,837,824 | 9/1974 | Siegmund | 65/4.3 |
| 4,021,216 | 5/1977 | Asam et al. | 65/4.21 |
| 4,118,618 | 10/1978 | Gauthier et al. | 65/4.21 X |
| 4,148,965 | 4/1979 | Jelli | 65/60.4 X |

FOREIGN PATENT DOCUMENTS 2715443 10/1977 Fed. Rep. of Germany ....... 65/4.21

*Primary Examiner*—Kenneth M. Schor
*Attorney, Agent, or Firm*—Cushman, Darby and Cushman

[57] ABSTRACT

A process for producing an image fiber comprising drawing an image fiber preform consisting of a bundle of a plurality of optical fibers each of which is drawn from an optical fiber preform and consists of a core and a cladding, in which at least one of the optical fiber preform, the optical fiber, the image fiber preform and the image fiber is hydrogenated at a temperature higher than a room temperature, the image fiber produced having improved attenuation which is less increased when it is irradiated, particularly with gamma-ray.

9 Claims, No Drawings

PROCESS FOR PRODUCING IMAGE FIBER

FIELD OF THE INVENTION

The present invention relates to a process for producing an image fiber. More particularly, it relates to a process for producing an image fiber or a multi-core optical fiber attenuation of which is not significantly increased when it is exposed to radiation, for example, gamma-ray.

BACKGROUND OF THE INVENTION

When an image fiber is used under a condition under which it is exposed to radiation, particularly gamma-ray, its attenuation is increased. Such the attenuation increase of the image fiber, however, can be minimized by forming it with optical fibers each comprising a cladding made of fluorine-doped silica glass and a core made of pure silica.

Even in such the image fiber, its attenuation is caused to seriously increase by gamma-ray in a relatively broad range near visible red light having a wavelength of 0.63 micrometer and, in some cases, transmission of image through the image fiber becomes impossible. This is a serious drawback of conventional image fibers, particularly when it is used for the transmission of visible light. Thus, in order to improve the performance of image fiber, it is essential to minimize the attenuation increase at or near the wavelength of 0.63 micrometer.

It is said that the attenuation near the wavelength of 0.63 micrometer is caused by defects in $SiO_2$ glass, i.e. bond defects, which may be represented as follows:

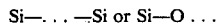

wherein . . . represents a bond defect. Therefore, it is believed that the attenuation increase at or near the wavelength of 0.63 micrometer can be suppressed by removing the bond defects in the silica glass.

The image fiber has a further drawbacks that it has more bond defects than the usual silica glass. This may be because anisotropy is created in the longitudinal direction so that the bonds become easily broken during drawing of the image fiber preform (cf. for example, R. Brückner, "Properties and Structure of Uitreous Silica, I", Journal of Non-Crystalline Solids, 5, 1970, 123–175).

Such defects are also found in an image fiber preform. However, the conventional image fiber or image fiber preform has not been treated so as to remove such bond defects.

It has now been found that such the bond defects in the image fiber can be removed by hydrogenating materials composing the image fiber not at the time of producing the core and cladding of the optical fiber, but after the production thereof to remove the bond defects, for example, by converting the bond defects such as Si—. . . and Si—O . . . into Si—H and Si—OH.

SUMMARY OF THE INVENTION

One of the object of the invention is to provide an image fiber which has greatly improved attenuation which is less increased than that of the conventional image fiber when it is irradiated, for example, with gamma-ray.

Another object of the invention is to provide a process for producing an image fiber of the invention.

Accordingly, the present invention provides a process for producing an image fiber comprising drawing an image fiber preform consisting of a bundle of a plurality of optical fibers each of which is drawn from an optical fiber preform and consists of a core and a cladding, in which at least one of the optical fiber preform, the optical fiber, the image fiber preform and the image fiber is hydrogenated at a temperature higher than a room temperature.

DETAILED DESCRIPTION OF THE INVENTION

In the process of the invention, hydrogen is introduced at any stage after the production of the optical fiber preform as described below.

In the first instance, the optical fiber preform is hydrogenated and then drawn to form an optical fiber. A plurality of the thus formed optical fibers are bundled and fused together by heating and, then, drawn to fabricate an image fiber.

In the second instance, after the fabrication of the optical fibers from the optical fiber preform, the optical fibers are hydrogenated. A bundle of the hydrogenated optical fibers are processed in the same manner as in the first instance to fabricate an image fiber.

In addition, the hydrogenation may be carried out on to the image fiber preform, and also on to the image fiber.

Furthermore, two or more, preferably all of the optical fiber preform, the optical fiber, the image fiber preform and the image fiber are hydrogenated.

The hydrogenation may be carried out in pure hydrogen gas or in air containing hydrogen at a partial pressure of at least 0.05 atm, preferably at least 0.1 atm. The treating temperature is higher than a room temperature and lower than about 1,600° C. which corresponds to the melting point of glass fibers, preferably form 200 to 1,000° C.

The present invention will be hereinafter explained in detail by following Examples.

EXAMPLES 1 to 5 and COMPARATIVE EXAMPLE

A silica cladding material doped with 2% by weight of fluorine was deposited around a core material of pure silica by the plasma outside deposition method to form a optical fiber preform (Stage 1). The thus formed optical fiber preform was drawn to form an optical fiber (Stage 2). Then, 5,000 optical fibers were bundled to form an image fiber preform (Stage 3). The image fiber preform was drawn to produce an image fiber composed of 5,000 image elements having a diameter of 1.2 mm (Stage 4).

Hydrogenation was carried out under the conditions shown in Table at one of Stages 1 to 4 and also at all the stages. The thus hydrogenated image fibers and an image fiber not hydrogenated at any stage (Comparative Example) were irradiated with gamma-rays at $10^5$ R/H for 2 hours. Thereafter, the increase of attenuation at a wavelength of 0.63 micrometer was measured. The results are shown in Table.

TABLE

| Example No. | 1 | 2 | 3 | 4 | 5 | Comparative |
|---|---|---|---|---|---|---|
| Hydrogenation Stage | Stage (1) | Stage (2) | Stage (3) | Stage (4) | All Stages | No hydrogenation |
| Hydrogenation Condition (1) | | | | | | |
| $H_2$ atmosphere | $H_2$ 100% 3 atm. | $H_2$ 100% 3 atm. | $H_2$ 100% 3 atm. | $H_2$ 100% 3 atm. | $H_2$ 100% 3 atm. | — |
| Temp. (°C.) | 1,000 | 1,000 | 1,000 | 200 | 1,000 at Stages (1) to (3) 200 at Stage (4) | — |
| Time (hrs) | 10 | 10 | 10 | 35 | 10 at Stages (1) to (3) 35 at Stage (4) | — |
| Attenuation increase (dB/km) ($\lambda = 0.63$ μm) | 320 | 290 | 270 | 200 | 120 | 400 |
| Hydrogenation Condition (2) | | | | | | |
| $H_2$ partial pressure in air (Atm.) | 0.1 | 0.1 | 0.1 | 0.1 | 0.1 | — |
| Temp. (°C.) | 1,000 | 1,000 | 1,000 | 200 | 1,000 at Stages (1) to (3) 200 at Stage (4) | — |
| Time (hrs) | 10 | 10 | 10 | 35 | 10 at Stages (1) to (3) 35 at Stage (4) | — |
| Attenuation increase (dB/km) ($\lambda = 0.63$ μm) | 360 | 340 | 330 | 280 | 240 | 400 |

As can be seen from the results shown in Table, the increase in attenuation due to irradiation with gamma-ray of the image fiber not subjected to any heat treatment was 400 dB/km, whereas the increase in attenuation of the image fibers according to the present invention were 120 to 360 dB/km and thus were greatly reduced.

Although the above explanation has been made to an image fiber consisting of optical fibers comprising the core of pure silica and the cladding of fluorine-doped silica, the present invention is not limited to image fibers of the foregoing structure and is effective for image fibers of other Structures.

What is claimed is:

1. A process for producing an image fiber comprising drawing an image fiber preform consisting of a bundle of a plurality of optical fibers each of which is drawn from an optical fiber preform and consists of a core and a cladding, in which at least one of the optical fiber preform, the optical fiber, the image fiber preform and the image fiber is hydrogenated at a temperature higher than a room temperature in a gas containing hydrogen at a partial pressure of at least 0.05 atmosphere.

2. A process according to claim 1, wherein the optical fiber preform is hydrogenated.

3. A process according to claim 1, wherein the optical fiber is hydrogenated.

4. A process according to claim 1, wherein the image fiber preform is hydrogenated.

5. A process according to claim 1, wherein the image fiber is hydrogenated.

6. A process according to claim 1, wherein all of the optical fiber preform, the optical fiber, the image fiber preform and the image fiber are hydrogenated.

7. A process according to claim 1, wherein the hydrogenation is carried out in pure hydrogen gas.

8. A process according to claim 1, wherein the hydrogenation is carried out in air containing hydrogen at a partial pressure of at least 0.05 atm.

9. A process according to claim 1, wherein the hydrogenation temperature is lower than 1,600° C.

* * * * *